United States Patent
Kleven et al.

(10) Patent No.: US 6,643,610 B1
(45) Date of Patent: Nov. 4, 2003

(54) PROCESS TRANSMITTER WITH ORTHOGONAL-POLYNOMIAL FITTING

(75) Inventors: Lowell A. Kleven, Eden Prairie, MN (US); Ahmed H. Tewfik, Edina, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/405,196

(22) Filed: Sep. 24, 1999

(51) Int. Cl.$^7$ ................................................. G01F 1/34
(52) U.S. Cl. ......................... 702/183; 702/45; 702/138; 702/140
(58) Field of Search ........................... 702/183, 45, 47, 702/50, 85, 86, 98–100, 104, 105, 114, 124, 126, 127, 130, 132, 136, 138, 140, 188, 189, 31, FOR 134, FOR 141–FOR 143, FOR 155–FOR 163, FOR 165, FOR 103, FOR 104, FOR 119, FOR 123, FOR 124, FOR 127, FOR 128, FOR 169–FOR 171, FOR 173; 374/127, 128, 45, 170–172; 700/9, 54, 266, 275, 278, 281, 282, 299, 301; 73/1.01, 1.16, 1.34, 1.35, 1.57, 1.59, 861.01–861.03; 708/290, 495, 847

(56) References Cited

U.S. PATENT DOCUMENTS

| | | | |
|---|---|---|---|
| 3,564,912 A | 2/1971 | Malone et al. | 73/194 |
| 3,701,280 A | 10/1972 | Stroman | 73/194 |
| 4,103,551 A | 8/1978 | Lynnworth | 73/194 |
| 4,238,825 A | 12/1980 | Geery | 364/510 |
| 4,249,164 A | 2/1981 | Tivy | 340/870.3 |
| 4,403,296 A | 9/1983 | Prosky | 364/573 |
| 4,414,634 A | 11/1983 | Louis et al. | 364/510 |
| 4,419,898 A | 12/1983 | Zanker et al. | 73/861.02 |
| 4,437,164 A | 3/1984 | Branch, III | 364/571 |
| 4,446,730 A | 5/1984 | Smith | 73/301 |
| 4,485,673 A | 12/1984 | Stern | 73/304 |
| 4,528,855 A | 7/1985 | Singh | 73/721 |

(List continued on next page.)

FOREIGN PATENT DOCUMENTS

| | | |
|---|---|---|
| EP | 0 214 801 A1 | 3/1987 |
| EP | 0 223 300 A2 | 5/1987 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 97/04288 | 2/1997 |

OTHER PUBLICATIONS

Brochure: "Reduce Unaccounted–For Natural Gas with High–Accuracy Pressure Transmitters," Rosemount Inc. Measurement Division, Eden Prairie, Minnesota, ADS 3073, 5/91, pp. 1–4.

Technical Information Bulletin, "Liquid Level Transmitter Model DB40RL Sanitary Sensor deltapilot," Endress+ Hauser, Greenwood, Indiana, 9/92, pp. 1–8.

"The Digitisation of Field Instruments" W. Van Der Bijl, *Journal A*, vol. 32, No. 3, 1991, pp. 62–63 (No month).

"Single Chip Senses Pressure and Temperature," *Machine Design*, 64 (1992) May 21, No. 10, 1 page.

(List continued on next page.)

*Primary Examiner*—Hal Wachsman
(74) *Attorney, Agent, or Firm*—Westman, Champlin & Kelly, P.A.

(57) ABSTRACT

A transmitter for measuring a process variable includes a sensor configured to couple to a process and having a sensor output related to the process variable. A microprocessor coupled to the sensor output provides a process variable output which is a function of an orthogonal-polynomial of the sensor output. A transmitter output is configured to provide an output related to the process variable.

45 Claims, 8 Drawing Sheets

U.S. PATENT DOCUMENTS

| | | | |
|---|---|---|---|
| 4,562,744 A | 1/1986 | Hall et al. | 73/861.02 |
| 4,598,381 A | 7/1986 | Cucci | 364/558 |
| 4,602,344 A | 7/1986 | Ferretti et al. | 364/509 |
| 4,677,841 A | 7/1987 | Kennedy | 73/30 |
| 4,796,651 A | 1/1989 | Ginn et al. | 137/8 |
| 4,799,169 A | 1/1989 | Mims | 364/510 |
| 4,825,704 A | 5/1989 | Aoshima et al. | 73/861.42 |
| 4,864,462 A | 9/1989 | Madou et al. | 361/280 |
| 4,881,412 A | 11/1989 | Northedge | 73/861.04 |
| 4,958,938 A | 9/1990 | Schwartz et al. | 374/208 |
| 4,986,127 A | 1/1991 | Shimada et al. | 73/714 |
| 5,035,140 A | 7/1991 | Daniels et al. | 73/290 |
| 5,058,437 A | 10/1991 | Chaumont et al. | 73/861.21 |
| 5,495,769 A | 3/1996 | Broden et al. | 73/718 |
| 5,606,513 A | 2/1997 | Louwagie et al. | 364/510 |
| 5,772,323 A | 6/1998 | Felice | 374/127 |
| 5,857,777 A * | 1/1999 | Schuh | 374/172 |
| 5,949,695 A * | 9/1999 | Snell | 708/290 |
| 6,182,019 B1 * | 1/2001 | Wiklund | 702/138 |

OTHER PUBLICATIONS

Specification Summary, "TELETRANS™ 3508–10A Smart Differential Pressure Transmitter," (undated) Bristol Babcock, Inc., Watertown, CT, 06795, 10 pages.

Specification Summary, "TELETRANS™ 3508–30A Smart Differential Pressure Transmitter," (undated) Bristol Babcock, Inc., Watertown, CT, 06795, 11 pages.

Specification Summary, "AccuRate Advanced Gas Flow Computer, Model GFC 3308," (undated) Bristol Babcock, Inc., Watertown, CT, 06795, 12 pages.

Product Data Sheet 4640, "Model 3201 Hydrostatic Interface Unit," Mar. 1992, Rosemount Inc., Eden Prairie, MN 55344, 8 pages.

Product Data Sheet 4638, "Model 3001CL Flush–Mount Hydrostatic Pressure Transmitter," July 1992, Rosemount Inc., Eden Prairie, MN 55344, 3 pages.

"Flow Measurement," *Handbook of Fluid Dynamics*, V. Streeter, Editor–in–chief, published by McGraw–Hill Book Company, Inc. 1961, pp. 14–4 to 14–15 (No month).

"Precise Computerized In–Line Compressible Flow Metering," *Flow—Its Measurement and Control in Science and Industry*, vol. 1, Part 2, Edited by R. Wendt, Jr., Published by American Institute of Physics et al, (undated) pp. 539–540.

"Methods for Volume Measurement Using Tank–Gauging Devices Can Be Error Prone," F. Berto, *The Advantages of Hydrostatic Tank Gauging Systems*, undated reprint from *Oil & Gas Journal*, 7 pages.

"Hydrostatic Tank Gauging—Technology Whose Time Has Come," J. Berto, *Rosemount Measurement Division Product Feature*, undated reprint from *INTECH*, 2 pages.

"Pressure Sensors Gauge Tank Level and Fluid Density," *Rosemount Measurement Division Product Feature*, undated reprint from *Prepared Foods* (Copyrighted 1991 by Gorman Publishing Company), 2 pages (no month).

"A Systems Approach", by Dr. C. Ikoku, *Natural Gas Engineering*, 2 pgs. (undated).

"Low Cost Electronic Flow Measurement System," *Tech Profile*, May 1993, Gas Research Institute, Chicago, IL, 2 pages.

"Development of an Integrated EFM Device for Orifice Meter Custody Transfer Applications," S.D. Nieberle et al., *American Gas Association Distribution/Transmission Conference & Exhibit*, May 10, 1993, 5 pages.

Advertisement, AccuRate Model 3308 Integral Smart DP/P/T Transmitter, (undated) Bristol Babcock, Inc., Watertown, CT 06795, 1 page, (no date).

Advertisement, Model 3508 DP Transmitter, *Control Engineering*, Dec. 1992, Bristol Babcock, Inc., Watertown, CT 06795, 1 page.

"Smart Transmitters Tear Up The Market," C. Polsonetti, *INTECH*, Jul. 1993, pp. 42–45.

"Numerical Recipes in C", by W. Press et al., Cambridge University Press, 1990, pp. 51–59 and 158–162.

"Numerical Recipes in Fortran", by W. Press et al., Cambridge University Press, 1992, pp. 650–651 and 664–665 (no month).

"Model 3095 Flow Transmitter," Preliminary Product Information, September 1993, Rosemount Inc., Eden Prairie, MN 55344, 11 pages.

"Digital Computers For Gas Measuring Systems", by Robert D. Goodenough, 8131 *Advances in Instrumentation*, vol. 31, No. 4 (1976), pp. 1–4 (no month).

"Signal Transmission Put On A Pedestal", *Control and Instrumentation*, Sep., 1976, vol. 6, No. 8, pp. 28–29.

Ghosh D. et al., "Linearization of Transducers Through a Generalized Software Technique," Measurement Science and Technology, GB, IOP Publishing, Bristol, vol. 2, 1991, pp. 102–105 (no month).

P. Mahana et al., "Transducer Output Signal Processing Using an Eight–Bit Microcomputer," IEEE Transactions on Instrumentation and Measurement, No. 2, Jun. 1986 (1986–06), pp. 182–186.

Product Data Sheet PDS 4015, "Model 3095FT Flow Transmitters", by Rosemount Inc. Eden Prairie, MN 55344, Feb. 1994, pp. 1–15.

"Numerical Recipes in Fortran", by W. Press et al., Cambridge University Press, 1992, pp. 99–122.

"Orifice Metering Of Natural Gas and Other Related Hydrocarbon Fluid", Part 1, General Equations and Uncertainty Guidelines, American Gas Association, Report No. 3, American Petroleum Institute, API, 14.3, Gas Processors Association, GPA 8185–90, Third Edition, Oct. 1990, A.G.A. Catalog No. XQ9017.

"Orifice Metering Of Natural Gas and Other Related Hydrocarbon Fluid", Part 2, Specification and Installation Requirements, American Gas Association, Report No. 3, American Petroleum Institute, API 14.3, Gas Processors Association, GPA 8185–90, Third Edition, Feb. 1991, A.G.A. Catalog No. XQ9104.

"Orifice Metering Of Natural Gas and Other Related Hydrocarbon Fluid", Part 3, Natural Gas Applications, American Gas Association, Report No. 3, American Petroleum Institute, API 14.3, Gas Processors Association, GPA 8185–92, Third Edition, Aug. 1992, A.G.A. Catalog No. XQ9210.

"Orifice Metering Of Natural Gas and Other Related Hydrocarbon Fluid", Part 4, Background, Development, Implementation Procedure, and Subroutine Documentation for Empirical Flange–Tapped Discharge Coefficient Equation, American Gas Association, Report No. 3, American Petroleum Institute, API 14.3, Gas Processors Association, GPA 8185–92, Third Edition, Oct. 1992, 2nd Printing Aug. 1995, A.G.A. Catalog No. XQ9211.

"Compressibility Factors of Natural Gas and Other Related Hydrocarbon Gases", AGA Transmission Measurement Committee Report No. 8, American Petroleum Institute MPMS Chapter 14.2, Gas Research Institute, Catalog No. XQ9212, Second Edition, Nov. 1992, 2nd Printing Jul. 1994.

\* cited by examiner

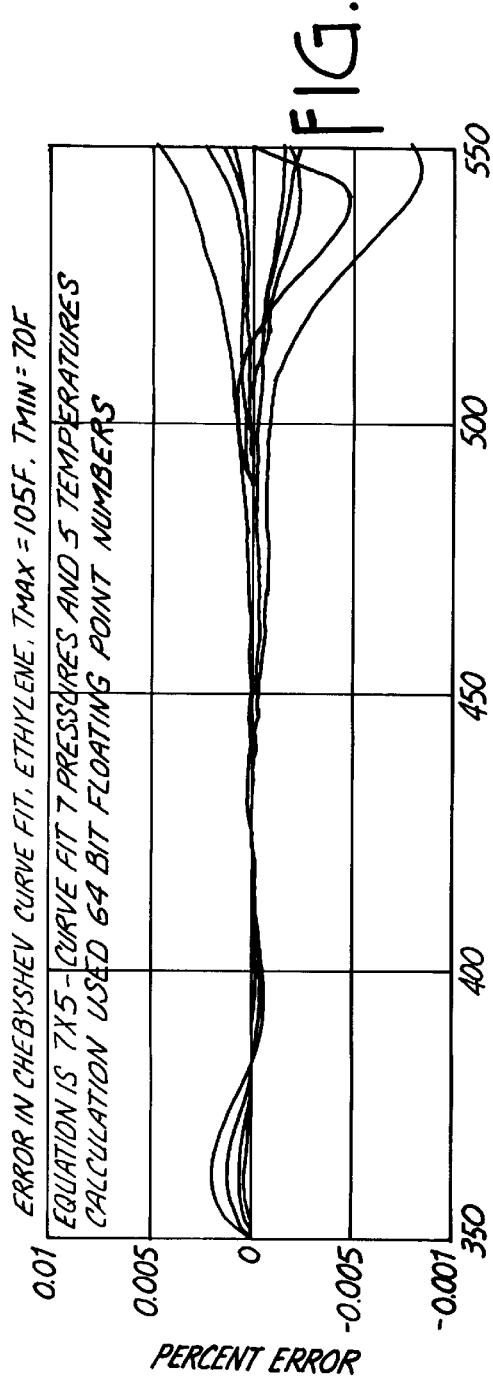
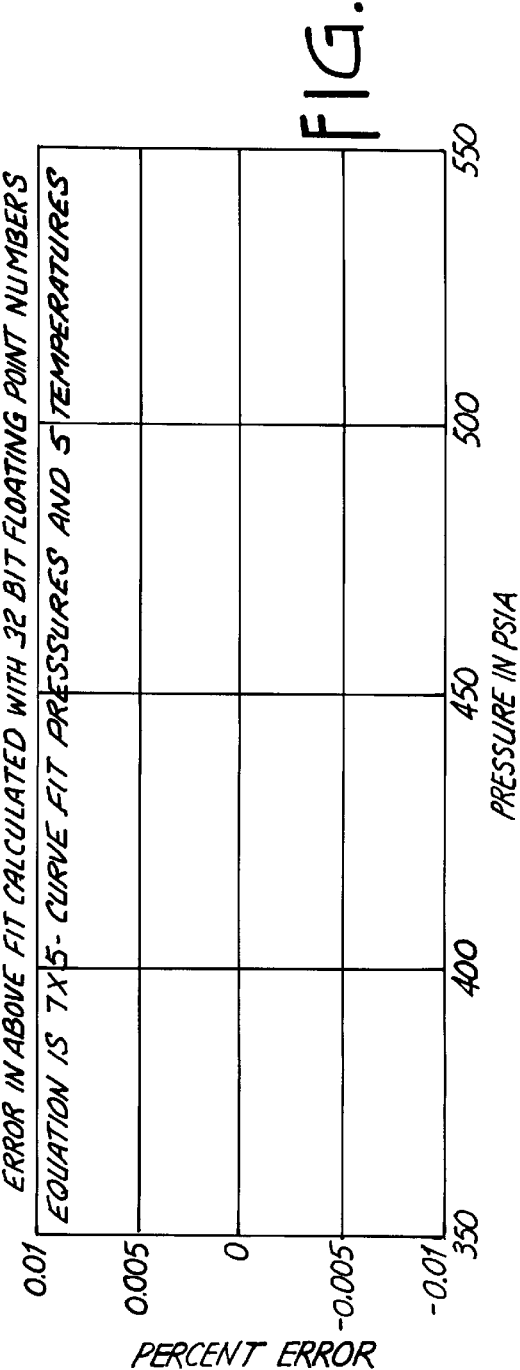

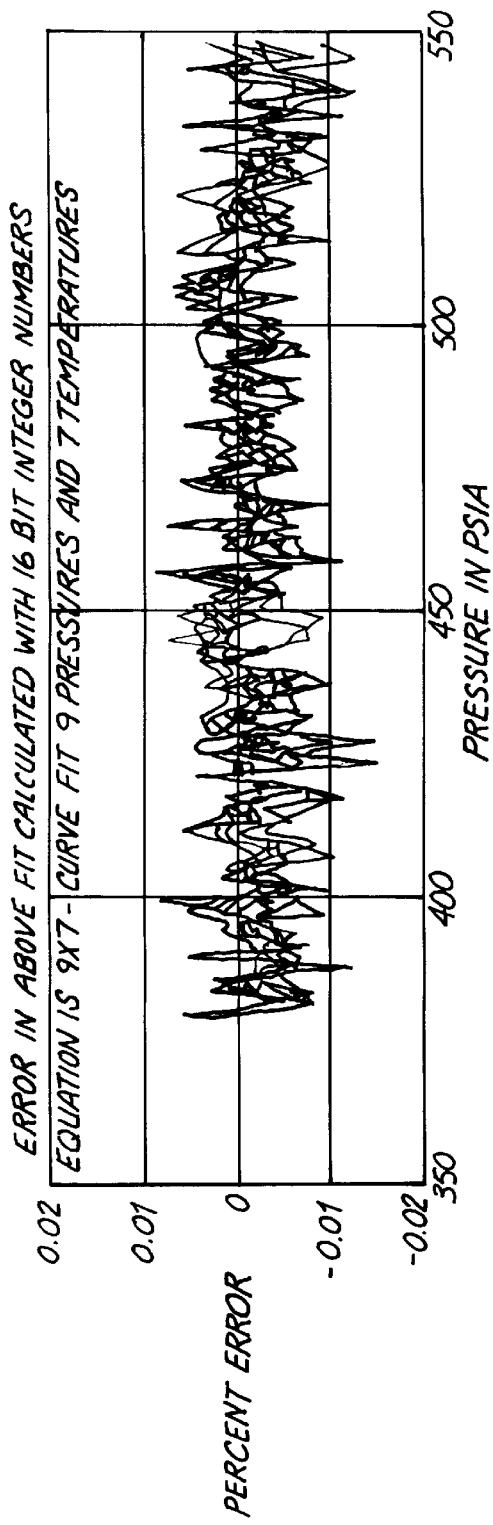
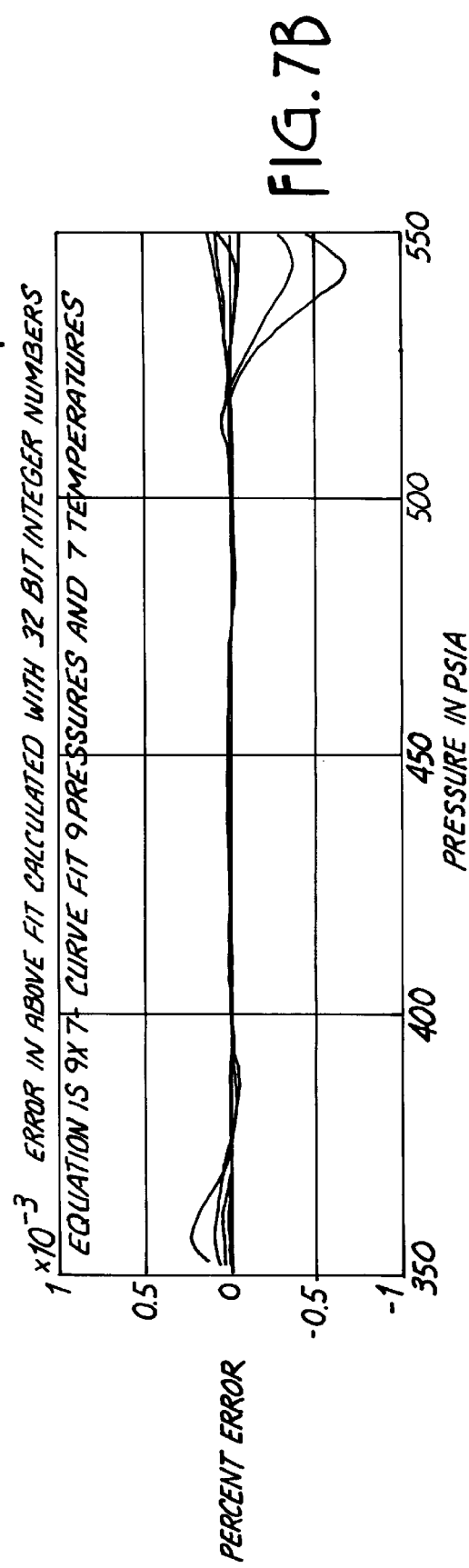

PROCESS TRANSMITTER WITH ORTHOGONAL-POLYNOMIAL FITTING

BACKGROUND OF THE INVENTION

The invention relates to the field of process measurement and control industry.

The process measurement and control industry employs process variable transmitters to remotely monitor process variables associated with fluids such as flurries, liquids, vapors, gases, chemicals, pulp, petroleum, pharmaceuticals, food and other processing plants. Examples of process variables include pressure, temperature, flow, level, turbidity, concentration, chemical composition, pH and other properties.

Complex mathematical computations are required to determine some process variables. For example, in order to determine flow by measuring differential pressure across an orifice plate, the computation requires the determination of physical properties of the fluid such as fluid density and the gas expansion factor. Calculation of these parameters involves extensive computation which reduces the update time of the transmitter, requires more complex processing equipment and requires increased power.

One technique to reduce the complexity of the calculations is to simply use fixed approximations for some of the parameters. For example, fixed values can be stored in memory rather than calculated using precise formulas. A more accurate technique is the use of straight polynomial curve fitting. In this technique, a process variable is estimated by using a less than complex polynomial rather than perform the precise computation. Such a technique is described in WIPO Publication No. WO 97/04288, filed Jun. 20, 1997 and entitled "TRANSMITTER FOR PROVIDING A SIGNAL INDICATIVE OF FLOW THROUGH A DIFFERENTIAL PRODUCER USING A SIMPLIFIED PROCESS" and U.S. Pat. No. 5,606,513, issued Feb. 25, 1997 and entitled "TRANSMITTER HAVING INPUT FOR RECEIVING A PROCESS VARIABLE FROM A REMOTE SENSOR". For example, the square root of the reciprocal of the compressibility (Z) of a fluid can be approximated using a "straight" polynomial in the form of:

$$\sqrt{1/Z} = \sum_{n=0}^{n=j} \sum_{m=0}^{m=k} A_{m,n} P^m T^{-n} \quad (1)$$

where P is the absolute pressure of the fluid, T is the absolute temperature and the coefficients $A_{m,n}$ are the coefficients of the interpolating polynomial.

FIGS. 3A and 3B illustrate errors in prior art polynomial curve fitting techniques. FIG. 3A shows the curve fit error for ethylene as a function of pressure for 10 different temperature values. The highest powers of pressure P and inverse temperature (1/T) in the interpolating polynomial are eight and six, respectively. The temperatures and pressures for ethylene are not far from saturation pressures and temperatures. The minimum number (63) of pressure and temperature points was used to determine the 63 coefficients $A_{m,n}$ of the interpolation polynomial set forth in Equation 1, with j=6 and k=8. FIG. 3A illustrates the large error associated with straight polynomial curve fitting, particularly at the pressure extremes. FIG. 3B illustrates an even greater error when 32 bit floating point numbers (with 24 bit mantissa) are used. As illustrated in FIG. 3B, the results are essentially meaningless, with errors exceeding $10^5$ percent. In the example of FIG. 3B, the coefficients were determined with 64 bit numbers and the calculation of the fitting polynomial was performed with 32 bit floating point numbers. Note that 32 bits is the typical number of bits used in floating point math performed in microprocessors. The use of a least squares fitting technique reduces the roughness produced by the loss of significant digits. However, the errors produced with such curve fitting are still relatively large in some situations.

This approximation technique is inaccurate, particularly when the highest power in the polynomial exceeds three or four and the polynomial is formed with multiple independent variables. This inaccuracy can cause inaccuracies in the measured process variable. Typically, the only solution has been to use the exact equations which require powerful computers and high power.

SUMMARY OF THE INVENTION

An interpolating polynomial is used to determine a process variable in a transmitter. The interpolating polynomial is "orthogonal" and provides an accurate estimation of the process variable without a significant increase in power consumption. The transmitter includes a sensor configured to couple to a process and having a sensor output related to the process variable. The transmitter also includes a microprocessor coupled to the sensor output and having a process variable output. The process variable output is an orthogonal-polynomial function of the sensor output. A transmitter output is configured to provide an output related to the interpolated process variable.

BRIEF DESCRIPTION OF THE DRAWINGS

FIGS. 5A and 5B are graphs of percent error versus pressure for various temperatures for a Chebychev polynomial interpolation using a 7×5 matrix using 64 bit floating point numbers and 32 bit floating point numbers, respectively.

FIGS. 7A and 7B are graphs of percent error versus pressure for various temperatures for a Chebychev polynomial interpolation using 16 bit integer numbers and 32 bit integer numbers, respectively.

DETAILED DESCRIPTION OF THE ILLUSTRATIVE EMBODIMENTS

Figure 1:
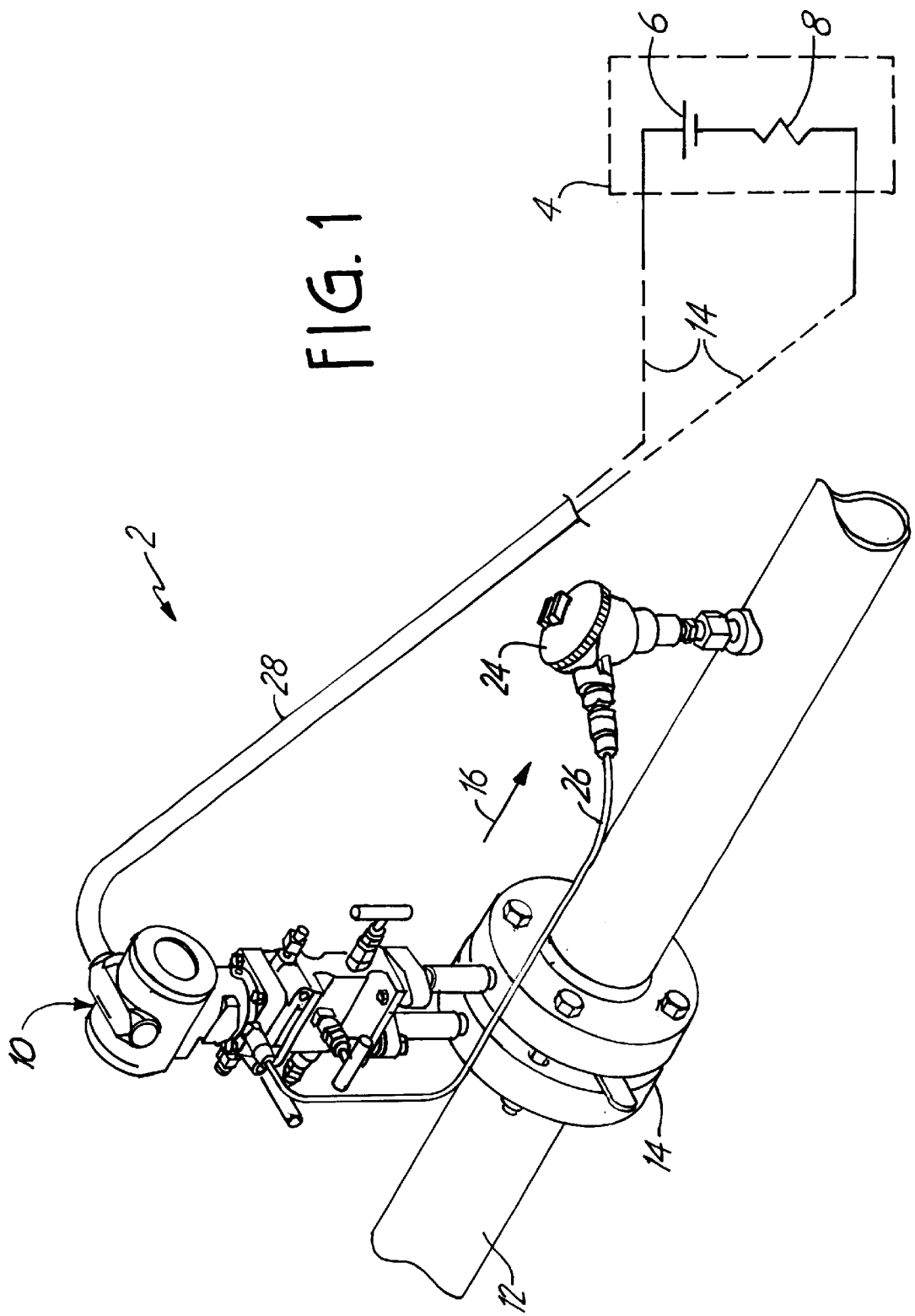
FIG. 1 is an environmental view of an embodiment of a process transmitter, and in particular a flow transmitter, of the invention.

FIG. 1 illustrates the environment of a process transmitter such as flow transmitter 10 of a process measurement or control system 2. Transmitter 10 couples to control room 24 through a two-wire process control loop 14 (shown substantially as voltage source 6 and resistance 8). Transmitter 10 is coupled to a process fluid container such as pipe 12 through pipe fitting or flange 14. Pipe 12 conducts flow of a fluid, such as a gas or liquid, in the direction indicated by arrow 16. The following description sets forth a transmitter such as transmitter 10 for measuring a process variable. The process variable is estimated using a mathematical technique known as polynomial interpolation. A specific type of polynomial, known as an orthogonal-polynomial, is used in the polynomial interpolation. The orthogonal-polynomial provides highly accurate estimations of the process variable without requiring excessive computation. The following description is provided to illustrate and explain aspects of the invention. This description does not limit the scope of the invention and those skilled in the art will recognize that the particular implementation can vary from the specific examples set forth herein.

Transmitter 10 determines flow through pipe 12 by measuring a differential pressure, static pressure and temperature and includes transmitter electronics module 18. Transmitter 10 couples to a resistive temperature device (RTD) carried in temperature sensor housing 24 through electrical conduit 26. Transmitter 10 includes a differential pressure sensor and an absolute pressure sensor. The transmitter 10 provides an output signal indicative of flow of the process fluid flowing through pipe 12 to control room 4 by 4–20 mA two-wire loop 14 preferably formed using twisted pair of conductors through flexible conduit 28. Transmission can be for example, in accordance with the Highway Addressable Remote Transducer (HART®) or Foundations™ Fieldbus standards. Flow is determined using an interpolation polynomial, such as an orthogonal-polynomial in accordance with one aspect of the invention, as will be described later in the specification.

Figure 2:
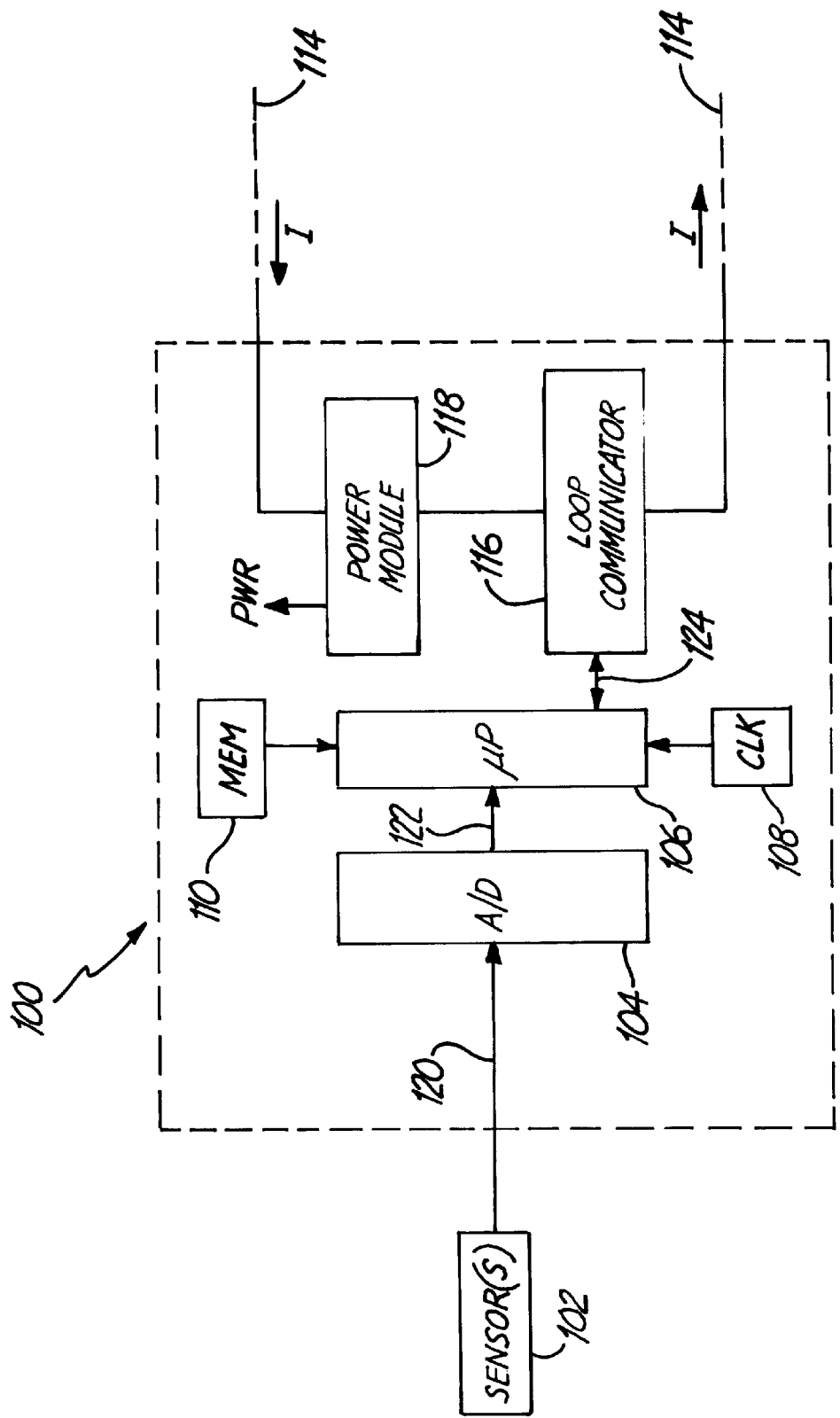
FIG. 2 is a schematic illustration of a process transmitter.
Figure 3A:
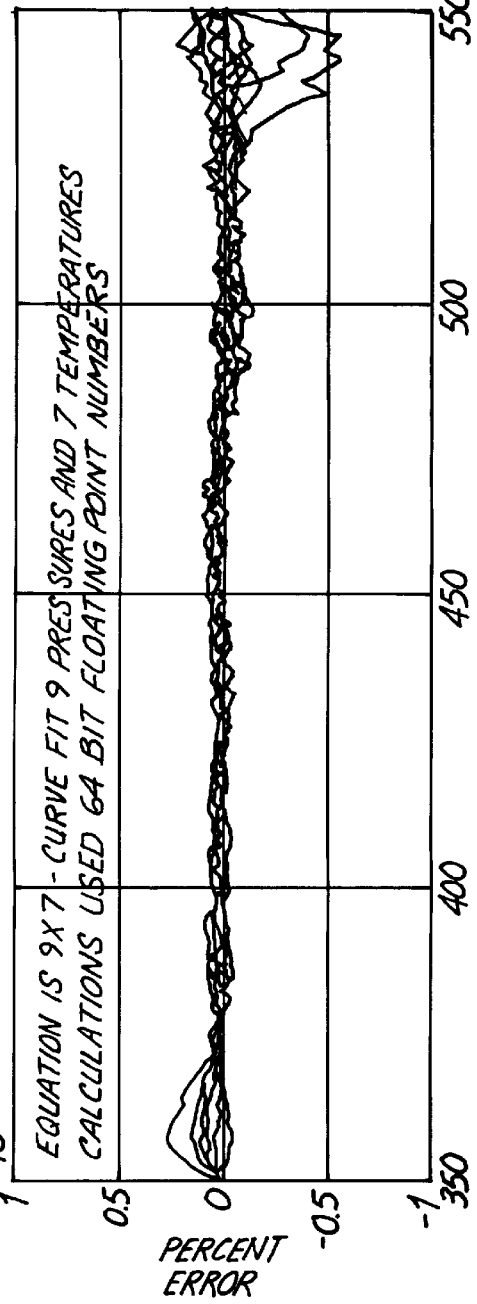
FIGS. 3A and 3B are prior art graphs of percent error versus pressure for various temperatures for an interpolation of a process variable performed exactly and an interpolation formed using 32 bit floating point numbers, respectively.
Figure 3B:
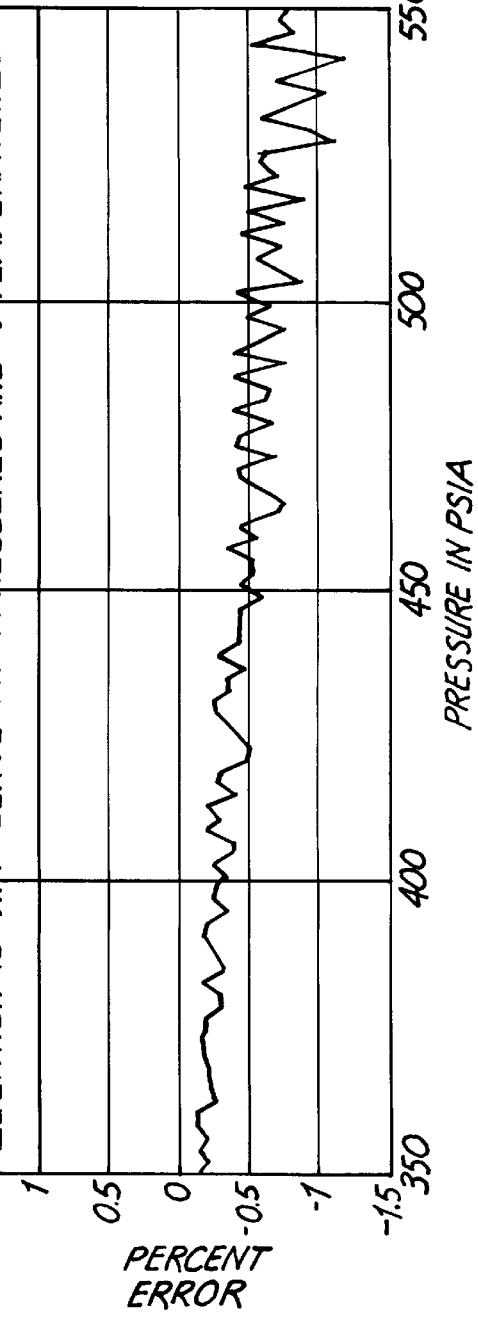

FIG. 2 is a simplified block diagram of a process transmitter 100 which couples to sensor 102 (in some embodiments, element 102 represents multiple sensors) which may be either internal or external to the housing for transmitter 100. The output from sensor 102 is digitized by analog to digital converter 104 and provided to a polynomial interpolator embodied in microprocessor 106. Microprocessor 106 operates at a rate determined by clock 108 and in accordance with instructions stored in memory 110. Memory 110 can also store both permanent and temporary variables. Microprocessor 106 couples to a loop communicator 112 which couples to loop 114.

Transmitter 100 is used to measure a process variable. Sensor 102 is configured to couple to a process, such as process fluid carried in pipe 12 shown in FIG. 1, and provide a sensor output 120 to analog to digital converter 104. Analog to digital converter 104 provides a digitized output 122 to a polynomial interpolator such as microprocessor 106 which provides a process variable output 124 to a transmitter output such as loop communicator 116. The process variable output 124 is a function of an orthogonal-polynomial of sensor output 120. Memory 110 stores the coefficients of the orthogonal-polynomial. The orthogonal-polynomial function is used to approximate the process variable based upon the sensor output using a mathematical method known as interpolation. The measured process variable can be a function of more than one sensor output as described below. Orthogonal-polynomials are known in mathematics and are classes of polynomials $p_n(x)$ over a range (a,b) which obey the relationship:

$$\int_a^b \int_a^b p_m(x) p_n(x) dx = 0 \quad m \neq n. \tag{2}$$

In one aspect, the orthogonal-polynomial function is a particular type of orthogonal polynomial known as a Chebychev polynomial for approximating the process variable through mathematical interpolation. (The Chebychev polynomial is explained below.) In another aspect, an interpolation polynomial is used to approximate the process variable in which the terms of the polynomial are functions of more than one exponential power of the sensor output.

FIG. 2 is provided for illustrative purposes and actual transmitter configurations can vary. For example, the functions performed by microprocessor 106 can be performed by a number of different microprocessors or circuits. The output from sensor 102 can be processed prior to its analog to digital conversion by analog to digital converter 104. Additional compensation steps can be performed using digital circuitry. Many functions can be implemented in either hardware or software, or in their combination. The particular configuration set forth in FIG. 2 should not limit the scope of the invention and those skilled in the art will recognize that the configuration can be modified. For example, sensor 102 can comprise more than one sensor and the interpolated process variable can be a function of more than one sensor output from differing sensors. Typically, each additional sensor output requires an additional term in the interpolation polynomial.

One example of two-wire process control loop carries a current I which has a minimum value of 4 mA and a maximum value of 20 mA. Data can be transmitted in a digital and/or an analog format. Loop communicator 116 is also used by microprocessor 106 to receive data from loop 114. A power module 118 is used to provide power to components in transmitter 100 using power received from loop 114. In some types of transmitters, the transmitter is completely powered with power received from loop 114.

Embodiments of the invention make use of orthogonal-polynomials to form the interpolation equation and solve the resulting system of equations for the coefficients. While many types of orthogonal-polynomials exist, one specific orthogonal-polynomial is a discrete polynomial, known as a discrete orthogonal Chebychev polynomial (hereafter Chebychev polynomial) that provides improved accuracy for process transmitters. In a process transmitter, the independent variables have a finite range and the input and/or calibration data is usually uniformly spaced over the range of the independent variables. Further, the measurements are typically performed with five or six significant digits of accuracy and the required accuracy of the calculated independent variables is in the range of 0.1 to 0.001 percent. Embodiments of the invention can use types of orthogonal-polynomials other than the particular Chebychev polynomial set forth.

Figure 4A:
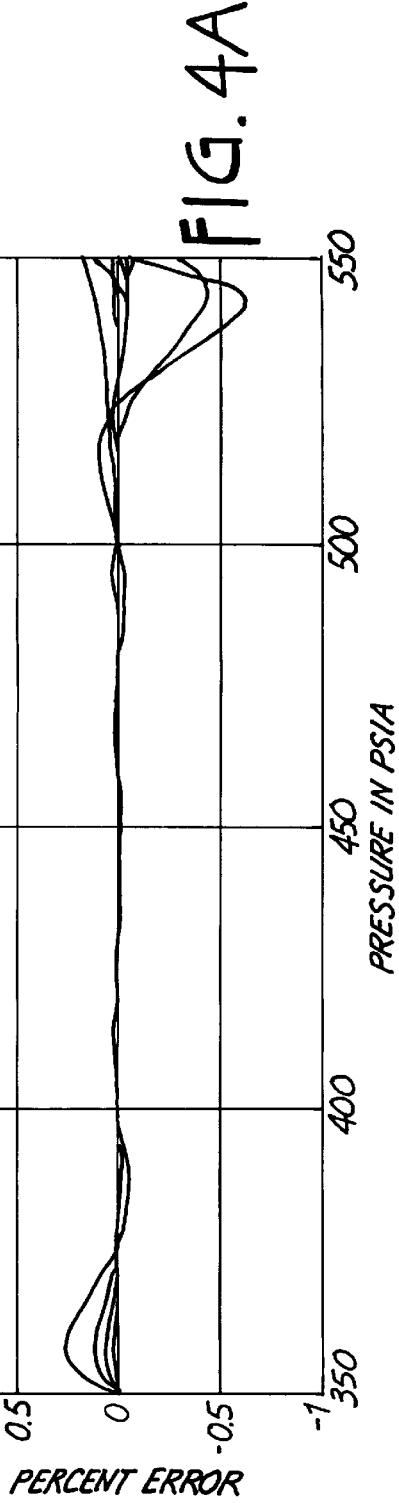
FIGS. 4A and 4B are graphs of percent error versus pressure for various temperatures using a Chebychev polynomial interpolation calculated using 64 bit floating point numbers and 32 bit floating point numbers, respectively.
Figure 4B:
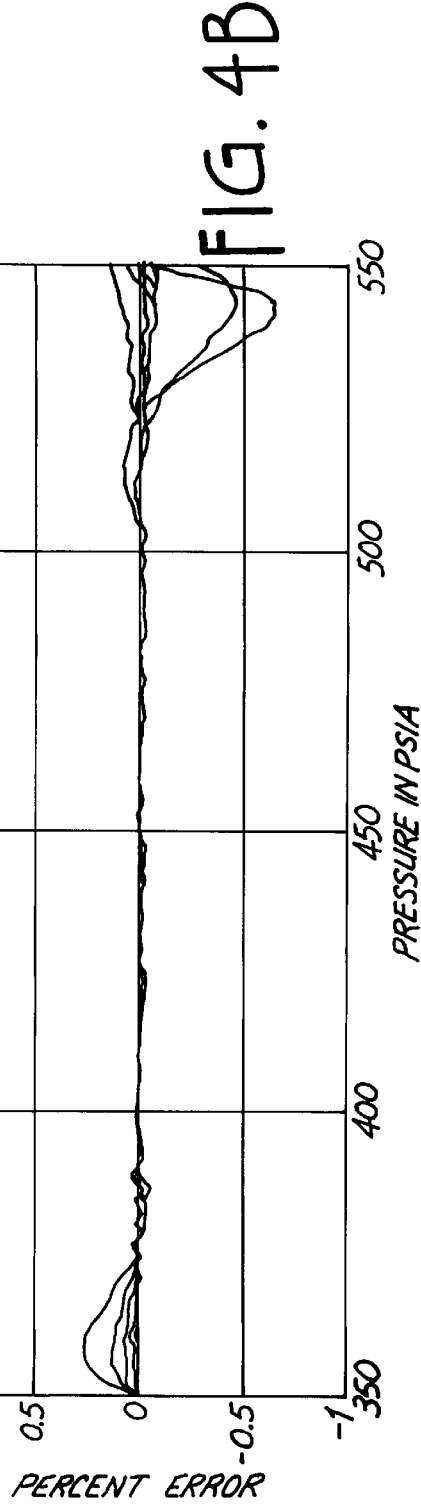

FIGS. 4A and 4B are graphs of the error in the curve fit using a Chebychev polynomial in accordance with embodiments of the invention. FIG. 4B illustrates a relatively good curve fit even when 32 bit floating point calculations are used. This level of accuracy can be achieved with prior art straight polynomial curve fitting techniques only if 64 or more bits are used. Although Chebychev polynomial interpolation requires some additional calculations and additions than prior art techniques, the improved accuracy offsets the slight increase in calculation complexity. For example, evaluating a 9×7 straight interpolating polynomial ($8^{TH}$ power in pressure and $6^{TH}$ power in temperature) requires 62 multiplies and 62 adds. In contrast, a 9×7 Chebychev interpolation requires 88 multiplies and 78 adds. However, this increase in complexity is not particularly significant and only requires a small amount of additional power in view of the improved accuracy in the process variable measurements. Further, the Chebychev interpolation polynomial provides improved accuracy, even when a smaller number of bits are used for the calculation. The curve fit improves sufficiently using the Chebychev polynomial that the number of terms in the fitting polynomial can be reduced while maintaining acceptable accuracy. FIG. 5A shows the accuracy of a 7×5 exact Chebychev interpolation and FIG. 5B illustrates errors when 32 bit floating point numbers are used. The results compare favorably to a 9×7 least square curve fit. Further, in the 7×5 Chebychev polynomial curve fit the number of multiplies is reduced to 52 and number of additions is reduced to 46, which is less than those required by a 9×7 straight polynomial interpolation.

An nth order Chebychev polynomial can be denoted as $T_n$ (x). The highest power of x in $T_n$ (x) is n. Discrete Chebychev polynomials are orthogonal over a discrete set of integers, $0 \leq k \leq N-1$, $m, n \leq N-1$. Specifically, orthogonal-polynomials are denoted as:

$$\sum_{k=0}^{k=N-1} T_n(k)T_m(k) = 0 \text{ if } m \neq n. \tag{3}$$

One specific Chebychev polynomial obeys the recursive formula:

$$T_n(x) = \frac{(2(n-1)+1)}{n} T_1(x)T_{n-1}(x) - \frac{(n-1)}{n}(N^2 - (n-1)^2)T_{n-2}(x), \tag{4}$$

$$0 \leq x \leq N-1$$

in which, $T_0(x)=1$, $T_1(x)=2X-(N-1)$, n is the order of the Chebychev polynomial and N is the number of independent pressure and temperature readings that are used to determine the coefficients of the interpolating linear combination of Chebychev polynomials. For example, if N=7 $T_n(x)$ can be expanded as:

$$T_0(x)=1 \tag{5}$$

$$T_1(x)=2x-6 \tag{6}$$

$$T_2(x)=6x^2-36x+30 \tag{7}$$

$$T_3(x)=20x^3-180x^2+400\,x-120 \tag{8}$$

$$T_4(x)=70x^4-840x^3+3110\,x^2-3540x=360 \tag{9}$$

$$T_5(x)=252x^5-3780x^4+19740\,x^3-41580x^2+28968x-720 \tag{10}$$

$$T_6(x)=924x^6-16632x^5+112560\,x^4-352800x^3+501396\,x^2-250488x+720 \tag{11}$$

Note that $n \leq N-1$ or the highest order of the Chebychev polynomial must be less than the number of independent pressure or temperature points. As illustrated in Equations 6–11, in one aspect polynomial terms are used which include more than one exponential power of the sensor output x.

In one example, an orthogonal-polynomial approximation is used to obtain density ($\rho$) using the gas law $\rho=P/ZRT$. R is the gas constant of the fluid being used and $\rho$ is the density. To perform a curve fitting to 1/Z where Z is the compressibility, (1/Z is used to avoid divisions in the microprocessor), Equation 12 is used:

$$1/Z = \sum_{n=0}^{n=NTE-1} \sum_{m=0}^{m=NPE-1} A_{m,n}T_m(xp)T_n(xs), \tag{12}$$

where P is pressure, P is the minimum pressure, S is 1/T, T is temperature, $S_{min}$ is the minimum value of 1/T, NPE is the number of coefficients for pressure, NTE is the number of coefficients for temperature, $xp=(P-P_{min})/\Delta P$, $xs=(S-S_{min})/\Delta S$, $S=1/T$, NPE−1 is the largest power of pressure or order of the Chebychev polynomial used for pressure, NTE−1 is the largest power of temperature or order of the Chebychev polynomial used for temperature, $\Delta P=(P_{max}-P_{min})/(NPt-1)$, $\Delta S=(1/T_{min}-1/T_{max})/(NTt-1)$, $A_{m,n}$ are the coefficients of the Chebychev interpolation formula and NPt and NTt are the numbers of pressure points and temperature points, respectively, used in the curve fit. The range of xp is from 0 to NPt−1 and xs is from 0 to NTt−1.

The coefficients $A_{m,n}$ are solved by forming Chebychev matrices corresponding to the pressure (P) and temperature (S=1/T) variables. These matrices are shown below:

$$Q1 = \begin{bmatrix} T_0(xp_1) & T_1(xp_1) & T_2(xp_1) & \ldots & T_m(xp_1) \\ T_0(xp_2) & T_1(xp_2) & T_2(xp_2) & \ldots & T_m(xp_2) \\ T_0(xp_3) & T_1(xp_3) & T_2(xp_3) & \ldots & T_m(xp_3) \\ \vdots & \vdots & \vdots & \vdots & \vdots \\ T_0(xp_{NPt}) & T_1(xp_{NPt}) & T_2(xp_{NPt}) & \ldots & T_m(xp_{NPt}) \end{bmatrix} \tag{13}$$

$$Q2 = \begin{bmatrix} T_0(xs_1) & T_1(xs_1) & T_2(xs_1) & \ldots & T_n(xs_1) \\ T_0(xs_2) & T_1(xs_2) & T_2(xs_2) & \ldots & T_n(xs_2) \\ T_0(xs_3) & T_1(xs_3) & T_2(xs_3) & \ldots & T_n(xs_3) \\ \vdots & \vdots & \vdots & \vdots & \vdots \\ T_0(xs_{NTt}) & T_1(xs_{NTt}) & T_2(xs_{NTt}) & \ldots & T_n(xs_{NTt}) \end{bmatrix} \tag{14}$$

The columns of the matrices Q1 and Q2 are normalized by dividing by the square root of the sum of the squares of all entries in each column. For example, the normalization factor for the $n^{th}$ column of Q1 is:

$$norp(m) = \frac{1}{\sqrt{(T_m(xp_1))^2 + (T_m(xp_2))^2 + (T_m(xp_3))^2 + \cdots + (T_m(xp_{NPt}))^2}} \tag{15}$$

The normalization factors for the $n^{th}$ column of Q2 is:

$$nort(n) = \sqrt{(T_n(xs_1))^2 + (T_n(xs_2))^2 + (T_n(xs_3))^2 + \cdots + (T_n(xs_{NTt}))^2} \tag{16}$$

The normalization factors are determined for the case when:

$$xp_1 \equiv 0;\ xp_2 \equiv 1;\ xp_3 \equiv 2;\ \ldots\ xp_m \equiv NPt-1 \tag{17}$$

$$xs_1 \equiv 0;\ xs_2 \equiv 1;\ xs_3 \equiv 2;\ \ldots\ xs_n \equiv NTt-1 \tag{18}$$

When P and S are uniformly spaced, and $xp_m$ and $xs_n$ are integers as shown above, this normalization turns the matrices Q1 and Q2 into orthogonal matrices with a unit condition number. Specifically, this provides $Q1^T \cdot Q1 = I_{NTE}$ and $Q2^T \cdot Q2 = I_{NTE}$, where $I_k$ denotes a k×k identify matrix.

Equation 12 can be rewritten in matrix form as:

$$Z = Q1\,A\,Q2^T \tag{19}$$

In the above equation, $Q2^T$ denotes the transpose of Q2, A is an NPE×NTE matrix whose $(m,n)^{th}$ entry is coefficient $A_{m,n}$ and Z is an NPt×NTt matrix whose $(m,n)^{th}$ entry is $1/Z(xp_m, xs_n)$. When $xp_m$ and $xs_n$ are integers, Equation 19 is easily solved as:

$$A = Q1^T Z Q2 \tag{20}$$

Equation 20 holds and is well-behave numerically because both Q1 and Q2 are orthogonal matrices with unit condition numbers.

One property of the above solution is that the magnitude of the elements of matrix A can be inspected to determine the relative importance of each term in the Chebychev interpolation formula. Small terms can be dropped from the calculation. Table 1 below shows the relative magnitudes of the entries of the A matrix that corresponds to the 9×7 Chebychev interpolation that we discussed in the previous section. The magnitudes of the entries of A are displayed as percentage of the magnitude of the largest coefficient. Columns correspond to temperatures and rows to pressure. As can be seen, the use 9×7 is probably not justified by the size of the coefficients.

TABLE 1

| | | | | | | |
|---|---|---|---|---|---|---|
| 100.0000 | 2.8771 | 0.2604 | 0.0288 | 0.0037 | 0.0005 | 0.0000 |
| 5.5079 | 1.1696 | 0.1782 | 0.0275 | 0.0042 | 0.0006 | 0.0001 |
| 0.6707 | 0.2835 | 0.0709 | 0.0148 | 0.0028 | 0.0004 | 0.0001 |
| 0.1094 | 0.0684 | 0.0236 | 0.0063 | 0.0014 | 0.0002 | 0.0000 |
| 0.0203 | 0.0163 | 0.0070 | 0.0023 | 0.0006 | 0.0001 | 0.0000 |
| 0.0039 | 0.0037 | 0.0019 | 0.0007 | 0.0002 | 0.0000 | 0.0000 |
| 0.0007 | 0.0008 | 0.0004 | 0.0002 | 0.0001 | 0.0000 | 0.0000 |
| 0.0001 | 0.0001 | 0.0001 | 0.0000 | 0.0000 | 0.0000 | 0.0000 |
| 0.0000 | 0.0000 | 0.0000 | 0.0000 | 0.0000 | 0.0000 | 0.0000 |

In order to have a unit condition number for matrices Q1 and Q2 and maintain orthogonality, the values for xp and xs have to be uniformly spaced over their range. However, this requirement does not have to be strictly enforced to make use of Chebychev polynomials. When $xp_m$ and $xs_n$ are not integers, Equation 19 can be solved directly or in a least squares sense as:

$$Q1^{-1}ZQ2^{-T}, NTt=NTE, NPt=NPE \quad A=(Q1_TQ1)^{-1}Q1^TZQ2(Q2^TQ2)^{-1}, NTt>NTE, NPt>NPE \quad (21)$$

Here $(Q1^TQ1)^{-1}$ denotes the inverse of $(Q1^TQ1)$ and $Q2^{-T}$ that of $Q2^T$. Equation 21 is reasonably well-behaved numerically. In experiments, the condition numbers of both Q1 and Q2 remained less than 450. While the above matrix Equation is formidable, most numerical computer math packages have special routines to solve these equations. The microprocessor 106 in transmitter 100 does not have to solve these equations. The equations are calculated off line and only the coefficient (stored in memory 110) are used in the microprocessor 106 as explained below. These equations can also be expanded and solved by Gaussian elimination techniques.

The normalization factors, norp(m) and nort(n), used to normalize Q1 and Q2 are always determined from uniformly spaced $xp_m$ and $xs_n$, and not from the actual $xp_m$ and $xs_n$. Several tests with the normalization factors determined from the actual non-uniform spacing of the data did not produce any substantial difference in accuracy.

The sensitivity of the Chebychev interpolation approach to non-uniformly spaced pressure and inverse temperature points was tested. The curve fit involved 7 temperatures and 9 pressure for ethylene. The curve fit errors of the uniformly spaced data are shown in FIGS. 4A and 4B. Each temperature and pressure point used in the curve fit was perturbed from its uniform position by a random amount uniformly distributed over the range±½ the uniform step size. Theoretically, this perturbation approach could lead to two identical pressure or temperature points. However, this did not happen during the test. Instead, the condition numbers for Q1 varied from 2 to 440 and those of Q2 from 1.2 to 65. The maximum error of the curve fit varied from 0.00034% to 0.0014%. The maximum fit error in FIGS. 4A and 4B was 0.00075%. This does not represent a significant change in the curve fit error.

A test was performed with an overdetermined system of equations by increasing the number of temperature and pressure points by one. In this case, the maximum condition numbers decreased to 34 and 19 for Q1 and Q2, respectively. The maximum curve fit error changed to 0.0012% as compared to a maximum fit error of 0.0006% for the uniform case. As more points are used in the curve fit, the condition numbers approach one and the maximum fit error approaches 0.00018% under the same test conditions as above. That maximum fit error compares favorably with a maximum fit error of 0.00015% when a large number of uniformly spaced pressure and inverse temperature points are used.

The numerical complexity of the Chebychev interpolation approach can be reduced by renormalizing the Chebychev polynomials. $T^P_m(xp)$ and $T^s_m(xs)$ are the normalized pressure and temperature Chebychev terms, respectively. These normalized polynomials are equal to the regular Chebychev polynomials (Equation 4) divided by a constant that depends on the order of the polynomial and the number of points used in the interpolation. They satisfy the following equations:

$$T_m^P(xp)=T_1^P(xp)T_{m-1}^P(xp)-Cp(m)T_{m-2}^P(xp) \quad (22)$$

and $$T_n^S(xs)=T_1^S(xs)T_{n-1}^S(xs)-Ct(n)T_{n-2}^S(xs) \quad (23)$$

In the above Equations:

$$T_1^P(xp)=Cp(1)(P-P_{min})-1 \quad (24)$$

$$T_0^P(xp)=1$$

$$T_1^S(xs)=Ct(1)(S-S_{min})-1$$

$$T_0^S(xs)=1 \quad (25)$$

Note that $S=1/T$ and $S_{min}=1/T_{max}$ where T is the absolute temperature. The values of pressure and temperature must be between the maximum and minimum pressure and temperature points used in the curve fitting.

To use the normalized Chebychev polynomials, the coefficients $A_{m,n}$ must be normalized appropriately. $B_{m,n}$ denotes the normalized interpolation coefficients. The coefficients $B_{m,n}$ are related to the coefficients $A_{m,n}$ through the formula:

$$B_{m,n}=A_{m,n}\text{norpt}(m)\text{nortt}(n) \quad (26)$$

The normalization factors Cp(m), Ct(n), norpt(m) and nortt(n) are evaluated as follows. The normalization factors, norp(m) and nort(n), used to form matrices Q1 and Q2 in the solution for $A_{m,n}$ are required to calculate these parameters. Initialize the normalization coefficients with the following relations:

$$Cp(1) = \frac{2}{(Npt-1)\Delta P}; \quad Ct(1) = \frac{2}{(NTt-1)\Delta S} \quad (27)$$

$$norpt(0) = \frac{1}{norp(0)}; \quad nortt(0) = \frac{1}{nort(0)} \quad (28)$$

$$norpt(1) = \frac{NPt-1}{norp(1)}; \quad nortt(1) = \frac{NTt-1}{nort(1)} \quad (29)$$

Next, perform the following recursion with m−2 to m−NPE−1 for the pressure points:

$$Cp(m) = \frac{(m-1)(NPt^2-(m-1)^2)}{(2(m-1)+1)(NPt-1)} \frac{norp(m-2)\,norpt(m-2)}{norp(m-1)\,norpt(m-1)} \quad (30)$$

$$norpt(m) = \frac{(2(m-1)+1)}{m(NPt-1)} \frac{norp(m-1)norpt(m-1)}{norp(m)} \quad (31)$$

and the following recursion with n=2 to n=NTE−1 for the temperature points:

$$Ct(n) = \frac{(n-1)(NTt^2 - (n-1)^2)}{(2(m-1)+1)(NPt-1)} \frac{nort(n-2)}{norp(n-1)} \frac{nortt(n-2)}{nortt(n-1)} \quad (32)$$

$$nortt(n) = \frac{(2(n-1)+1)}{n(NTt-1)} \frac{nort(n-1)nortt(n-1)}{nort(n)} \quad (33)$$

Finally, compute the independent variable, 1/Z in this case, in the transmitter using the Equation:

$$1/Z = \sum_{n=0}^{n=NTE-1} \sum_{m=0}^{m=NPE-1} B_{m,n} T_m^P(xp) T_n^S(xs) \quad (34)$$

along with Equations 22, 23, 24 and 25. The zero order Chebychev polynomial is not calculated since its value is 1.

Figure 6:
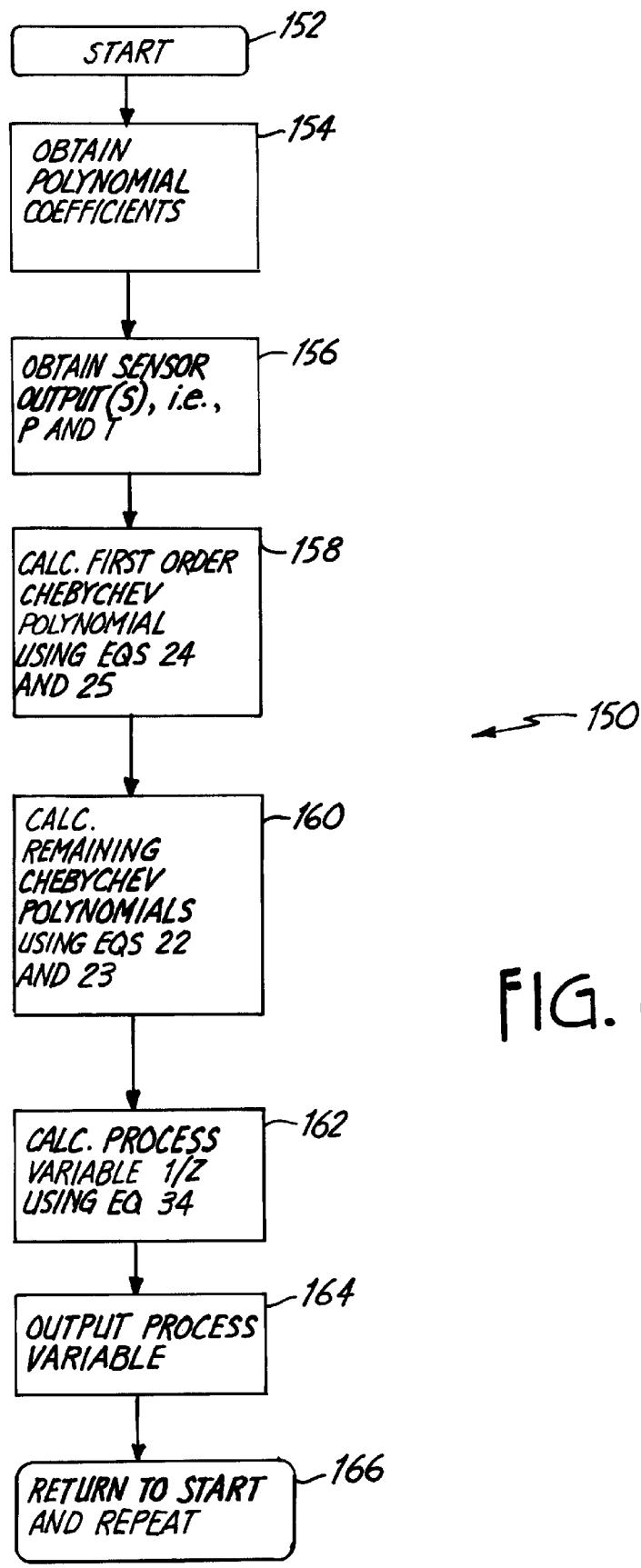
FIG. 6 is a block diagram in accordance with one implementation of the invention.

In summary, given the coefficient array $B_{m,n}$, the vectors Cp(m), Ct(n), $P_{min}$ and $S_{min}$, the calculation procedure for the microprocessor 106 in the transmitter 100 using the method 150 shown in FIG. 6. The method starts at start block 152. At block 154, microprocessor 106 retrieves the Chebychev polynomial coefficients from memory 110. At 156 sensor outputs 120, such as pressure and temperature, are obtained from the sensors and the first order Chebychev polynomial is calculated using Equations 24 and 25 at block 158. At 160, the remaining Chebychev polynomials are calculated using Equations 22 and 23. The process variable 1/Z is approximated using Equation 34 by microprocessor 106 at block 162. At block 164, the approximated process variable is output, for example, using loop communicator 116. At 166, control is returned to start block 152 and the interpolation process repeats.

To illustrate the required multiplications and additions, equation (34) is expanded below:

$$1/Z = [B_{0,0} + B_{1,0} T_1^P(xp) + B_{2,0} T_2^P(xp) + B_{3,0} T_3^P(xp) + \ldots + B_{m,0} T_m^P(xp)]$$

$$+ T_1^S(xs)[B_{0,1} + B_{1,1} T_1^P(xp) + B_{2,1} T_2^P(xp) B_{3,1} T_3^P(xp) + \ldots + B_{m,1} T_m^P(xp)]$$

$$+ T_2^S(xs)[B_{0,2} + B_{1,2} T_1^P(xp) + B_{2,2} T_2^P(xp) + B_{3,2} T_3^P(xp) + \ldots + B_{m,2} T_m^P(xp)]$$

$$+ T_3^S(xs)[B_{0,3} + B_{1,3} T_1^P(xp) + B_{2,3} T_2^P(xp) + \ldots + B_{m,3} T_m^P(xp)]$$

$$+ T_n^S(xs)[B_{0,n} + B_{1,n} T_1^P(xp) + B_{2,n} T_2^P(xp) + \ldots + B_{m,n} T_m^P(xp)] \quad (35)$$

Note that the $T_0(x)$ term has been dropped since its value is one. This equation requires NTE(NPE−1)+NTE−1 multiplies and adds. The Chebychev recursions (Equations 22, 23, 24, and 25) require 2(NPE+NTE)−6 multiplies and NPE+NTE adds. Therefore, the total complexity of the Chebychev interpolation approach is NPE×NTE+2(NPE+NTE)−7 multiples and NPE×NTE+NPE+NTE−1 adds. This is to be compared to the direct polynomial interpolation which requires NPE×NTE−1 multiplies and adds. This is an increase in the multiples and adds, but the benefits are great.

All of the above equations can be evaluated in integer math in microprocessor 106 provided that an additional normalization process is performed. If all the operations involve numbers in the range of ±1, then the results will also be in the same range. In this case, all numbers can be rescaled to $2^{n-1}$, where n is the number of 2's complement bits used in the calculation. The recursion relations given in Equations 22 and 23 produce values that fall in the range −1 to +1. The Cp and Ct normalization coefficients are also less than one with the exception of Cp(1) and Ct(1) that convert the temperature and pressure to $T_1(x)$. Therefore, if the input numbers representing pressure and temperature fit the integer format being used, Equation 24 and 25 can also be implemented in integer format.

To evaluate Equation 34 using integer math, two normalizations are performed. The first normalization scales 1/Z to have a maximum value of one. The second normalization scales the values of the coefficients $B_{m,n}$ so that the summations in Equation 34 do not produce a value greater than one.

To normalize 1/Z, divide all the entries $1/Z(xp_m, xs_n)$ of matrix Z by a constant Kf, where Kf is the maximum value of all the entries $1/Z(xp_m, xs_n)$ of matrix Z.

To normalize the coefficients $B_{m,n}$, solve for matrix A and produce matrix B whose entries are the coefficients $B_{m,n}$. Matrix B is then reduced by dividing through by nor, where nor is the sum of the absolute value of all the elements in matrix B. C denotes the resulting matrix. The entries $C_{m,n}$ of C are related to the coefficients $B_{m,n}$ through $C_{m,n} = B_{m,n}/\text{nor}$. This normalization guarantees that no summation will exceed 1. This is the most conservative normalization approach and guarantees that no summations will exceed 1.

Another normalization approach consists of sweeping the xp and xs values over their range and finding the maximum value of the resulting $T_n(xs)$ and $T_m(xp)$. This maximum value is used in conjunction with the appropriate $B_{m,n}$ coefficient to determine the maximum value that the sum can achieve. This value is then used as the normalization value nor. This normalization approach has the advantage of making better use of the available number range.

After the microprocessor 106 has calculated the normalized value of 1/Z, the correct value can be obtained by multiplying by Kf and nor. Specifically, 1/Z is computed as:

$$1/Z = Kf \cdot nor \cdot \sum_{n=0}^{n=NTE-1} \sum_{m=0}^{m=NPE-1} C_{m,n} T_m^P(xp) T_n^S(xs) \quad (36)$$

The constants Kf and nor are combined with some other constant such as the gas constant, R. The range of the input pressures and temperatures must be limited to slightly less then the curve, fit range so that round off errors do not cause the variables to exceed the maximum and minimum curve fit pressures and temperatures. Less than 1% reduction in range is necessary to achieve this condition.

Figure 8A:
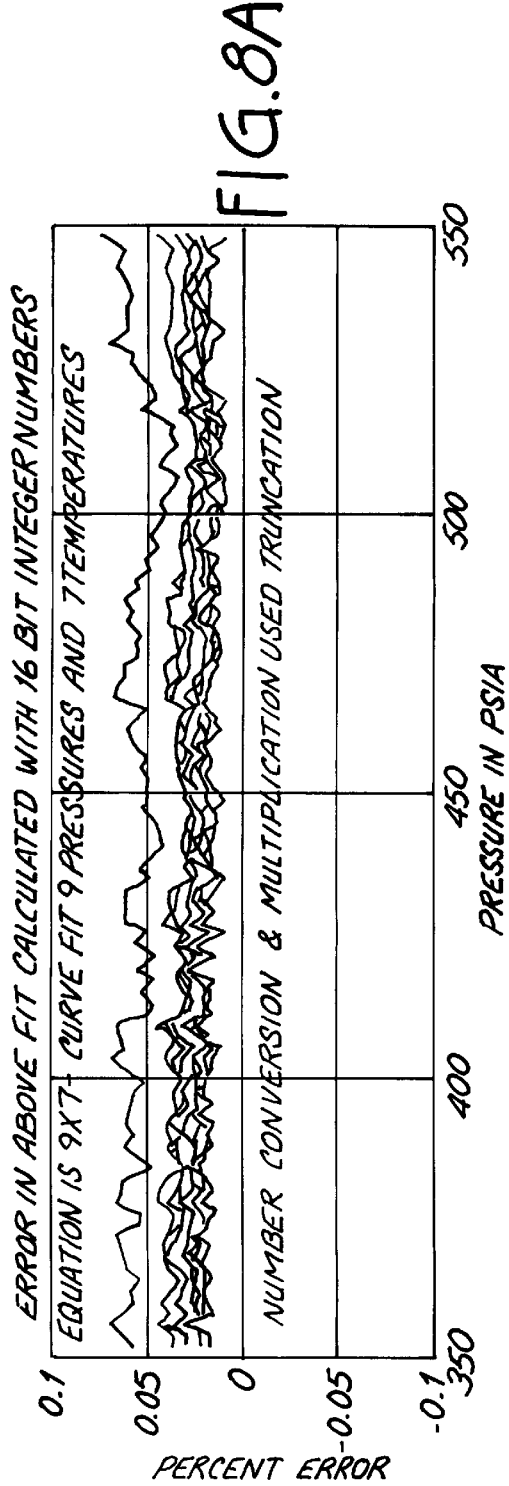
FIGS. 8A and 8B are graphs of percent error versus pressure for various temperatures for a Chebychev polynomial interpolation using 16 bit integer numbers and 32 bit integer numbers, respectively, in which the numbers were truncated.
Figure 8B:
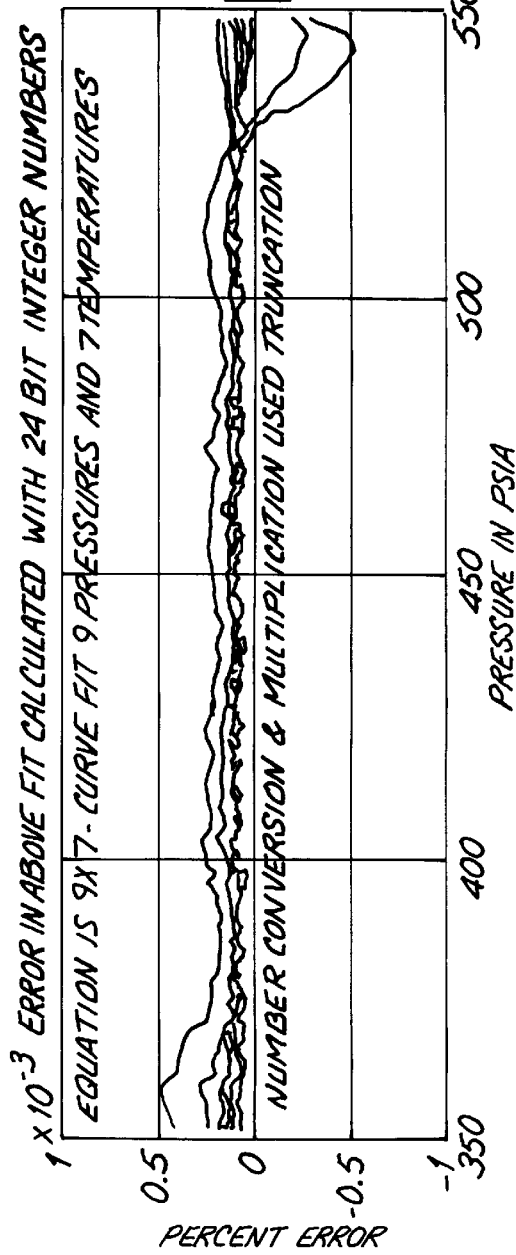

FIGS. 7A and 7B show the curve fit errors using 16 bit and 32 bit integer math, respectively. The 16 bit calculation shows that numerical errors are present. However, the magnitude of these errors is less than 3 or 4 least significant bits. For most transmitters, this accuracy is sufficient. These error curves were produced using rounding for all multiplications and converting numbers to 16 bit integers. If truncation is used, the errors are larger and produce systematic errors. With truncation, the errors approach 0.08% for 16 bit integers. FIGS. 8A and 8B show the results of truncation for 16 bit and 24 bit integers, respectively. The errors due to truncation just begin to appear when 24 bit integers are used.

Although the present invention has been described with reference to specific embodiments, workers skilled in the art will recognize that changes may be made in form and detail without departing from the spirit and scope of the invention. For example, the polynomial interpolator can be implemented in a microprocessor circuitry. In some aspects, orthogonal-polynomials other than the specific Chebychev polynomial disclosed herein are used. The polynomial can be used to estimate a process variable using any number of sensor outputs. For example, pressure can be corrected based upon a temperature reading and flow can be calculated based upon differential pressure, static pressure and temperature. The orthogonal-polynomial provides an accurate interpolation of a process variable without requiring highly complex calculations which have large electrical power requirements.

What is claimed is:

1. A transmitter for measuring a process variable, comprising:
   a sensor configured to couple to a process and having a sensor output related to the process variable;
   a polynomial interpolator coupled to the sensor output having an interpolated process variable output which is a function of an orthogonal-polynomial used to interpolate the sensor output, wherein the orthogonal polynomial reduces power consumption by the polynomial interpolator;
   a transmitter output configured to provide an output on a two-wire process control loop related to the interpolated process variable; and
   a power module configured to couple to the two-wire process control loop and completely power the transmitter with power received from the two-wire process control loop.

2. The transmitter of claim 1 wherein the orthogonal-polynomial comprises a Chebychev polynomial.

3. The transmitter of claim 2 wherein terms $T_n(x)$ of the Chebychev polynomial obey a recursive formula and wherein $T_n(x)$ is $n^{th}$ order Chebychev polynomial where n is the order of the Chebychev polynomial and x is related to the sensor output.

4. The transmitter of claim 3 wherein the recursive formula is:

$$T_n(x) = \frac{(2(n-1)+1)}{n} T_1(x) T_{n-1}(x) - \frac{(n-1)}{n} (N^2 - (n-1)^2) T_{n-2}(x),$$

$$0 \leq x \leq N-1$$

where T is the Chebychev polynomial, x is related to the sensor output, n is representative of an order of the Chebychev polynomial and N is representative of a number of independent readings of the sensor output.

5. The transmitter of claim 2 wherein the interpolated process variable is a function of at least two readings of the sensor output.

6. The transmitter of claim 1 wherein the two-wire process control loop comprises a 4–20 mA two-wire process control loop.

7. The transmitter of claim 1 wherein the polynomial interpolator comprises a microprocessor.

8. The transmitter of claim 1 wherein the polynomial interpolator represents numbers using 32 data bits.

9. The transmitter of claim 8 wherein the polynomial interpolator represents numbers using a 24 data bit mantissa.

10. The transmitter of claim 1 wherein the polynomial interpolator uses floating point numbers.

11. The transmitter of claim 1 wherein the polynomial interpolator uses integer numbers.

12. The transmitter of claim 1 wherein the interpolated process variable output is an orthogonal-polynomial function of two sensor outputs.

13. The transmitter of claim 12 wherein the two sensor outputs represent pressure and temperature.

14. The transmitter of claim 12 wherein the interpolated process variable output comprises pressure.

15. The transmitter of claim 1 wherein the interpolated process variable output is an orthogonal-polynomial function of three sensor outputs.

16. The transmitter of claim 15 wherein the three sensor outputs represent differential pressure, absolute pressure and temperature.

17. The transmitter of claim 16 wherein the interpolated process variable output comprises flow.

18. The transmitter of claim 16 wherein the interpolated process variable output comprises density.

19. The transmitter of claim 16 wherein the interpolated process variable output comprises a gas expansion coefficient.

20. The transmitter of claim 1 wherein the orthogonal polynomial is normalized.

21. The transmitter of claim 1 wherein the polynomial interpolator performs computation on integers to reduce power consumption.

22. A transmitter for measuring a process variable, comprising:
   a sensor configured to couple to a process and having a sensor output related to the process variable;
   a polynomial interpolator coupled to the sensor output having an interpolated process variable output which is a polynomial function of the sensor output, wherein terms of the polynomial function are functions of more than one exponential power of the sensor output, wherein the polynomial function reduces power consumption by the polynomial interpolator;
   a transmitter output configured to provide an output on a two-wire process control loop related to the interpolated process variable; and
   a power module configured to couple to the two-wire process control loop and completely power the transmitter with power received from the two-wire process control loop.

23. The transmitter of claim 22 wherein the polynomial function comprises a Chebychev polynomial.

24. The transmitter of claim 22 wherein the polynomial function comprises an orthogonal-polynomial.

25. The transmitter of claim 22 wherein the two-wire process control loop comprises a 4–20 mA two-wire process control loop.

26. The transmitter of claim 22 wherein the polynomial interpolator comprises a microprocessor.

27. The transmitter of claim 22 wherein the polynomial function is normalized.

28. The transmitter of claim 22 wherein the polynomial interpolator performs computation on integers to reduce power consumption.

29. A method performed by a process transmitter for measuring a process variable of a process, the method comprising:
   sensing a parameter of the process related to the process variable and providing a sensor output related to the process variable;
   approximating the process variable by interpolation using an orthogonal-polynomial applied to the sensor output to obtain an approximated process variable wherein the orthogonal polynomial reduces power consumption required by the approximating step;
   outputting the approximated process variable on a two-wire process control loop; and
   completely powering the transmitter with power received from the two-wire process control loop.

30. The method of claim 29 wherein the orthogonal-polynomial comprises a Chebychev polynomial.

31. The method of claim 30 wherein terms $T_n(x)$ of the Chebychev polynomial obey a recursive formula and wherein $T_n(x)$ is an $n^{th}$ order Chebychev polynomial where n is the order of the Chebychev polynomial and wherein x is related to the sensor output.

32. The method of claim 29 wherein approximating the process variable is a function of at least two sensor outputs from two different sensors.

33. The method of claim 29 wherein approximating the process variable includes representing numbers using 32 data bits.

34. The method of claim 29 wherein the approximated process variable is indicative of flow of process fluid.

35. The method of claim 29 wherein the orthogonal polynomial is normalized.

36. The method of claim 29 wherein the orthogonal polynomial allows integer computation to reduce power consumption required by the process transmitter.

37. A method for measuring a process variable in a process transmitter, comprising:

sensing a parameter of the process related to the process variable and providing a sensor output related to the process variable;

approximating the process variable using a polynomial function applied to the sensor output to obtain an approximated process variable, wherein terms of the polynomial function are functions of more than one exponential power of the sensor output wherein the polynomial function reduces power required by the approximating step;

outputting the approximated process variable on a two-wire wire process control loop; and completely powering the process transmitter with power received from the two-wire process control loop.

38. The method of claim 37 wherein the polynomial function comprises an orthogonal-polynomial.

39. The method of claim 37 wherein the terms of the polynomial function obey a recursive formula.

40. The method of claim 39 wherein the recursive formula is:

$$T_n(x) = \frac{(2(n-1)+1)}{n} T_1(x) T_{n-1}(x) - \frac{(n-1)}{n} (N^2 - (n-1)^2) T_{n-2}(x),$$

$$0 \le x \le N-1$$

where T is the Chebychev polynomial, x is related to the sensor output, n is representative of an order of the polynomial and N is representative of a number of independent readings of the sensor output.

41. The method of claim 37 wherein approximating the process variable includes applying the polynomial function to more than one sensor output for more than one sensor.

42. The method of claim 37 wherein the polynomial function allows integer computation to reduce power consumption required by the process transmitter.

43. A transmitter for measuring a process variable, comprising:

sensor means for providing a sensor output related to the process variable;

a polynomial interpolator means for determining an interpolated process variable as a function of an orthogonal-polynomial used to interpolate data from the sensor output, wherein the orthogonal polynomial reduces power consumption by the polynomial interpolator means;

an output means for communicating an output related to the interpolated process variable on a two-wire process control loop; and a power module means for completely powering the transmitter with power from the two-wire process control loop.

44. A device for monitoring a process, the device measuring a process variable, comprising:

a sensor configured to couple to a process and having a sensor output related to the process variable;

a polynomial interpolator coupled to the sensor output having an interpolated process variable output which is a function of an orthogonal-polynomial used to interpolate the sensor output;

a device output configured to provide an output related to the interpolated process variable; and wherein the polynomial interpolator performs computations using numerical integers with the orthogonal polynomial to reduce power consumption by the polynomial interpolator.

45. A device in a process control system for monitoring an industrial process, the device measuring a process variable, comprising:

a sensor configured to couple to a process and having a sensor output related to the process variable;

a polynomial interpolator coupled to the sensor output having an interpolated process variable output which is a polynomial function of the sensor output, wherein terms of the polynomial function are functions of more than one exponential power of the sensor output;

a device output configured to provide an output related to the interpolated process variable; and wherein the polynomial interpolator performs computations using numerical integers with the polynomial function to reduce power consumption by the polynomial interpolator.

* * * * *

UNITED STATES PATENT AND TRADEMARK OFFICE
CERTIFICATE OF CORRECTION

PATENT NO. : 6,643,610 B1
DATED : November 4, 2003
INVENTOR(S) : Kleven et al.

It is certified that error appears in the above-identified patent and that said Letters Patent is hereby corrected as shown below:

Column 7,
Lines 29-30, (equation 21), delete equation and insert:

$$A = \begin{cases} Q1^{-1} Z Q2^{-T}, & NTt + NTE, NPt = NPE \\ (Q1^T Q1)^{-1} Q1^T Z Q2 (Q2^T Q2)^{-1}, & NTt > NTE, NPt > NPE \end{cases}$$

Column 8,
Lines 38-46, (equation 35), delete equation and insert:

$$1/Z = [B_{0,0} + B_{1,0} T_1^p (xp) + B_{2,0} T_2^p (xp) + b_{3,0} T_3^p (xp) + \ldots + B_{m,0} T_m^p (xp)]$$
$$+ T_1^s (xs)[B_{0,1} + B_{1,1} T_1^p (xp) + B_{2,1} T_2^p (xp) + B_{3,1} T_3^p (xp) + \ldots + B_{m,1} T_m^p (xp)]$$
$$+ T_2^s (xs)[B_{0,2} + B_{1,2} T_1^p (xp) + B_{2,2} T_2^p (xp) + B_{3,2} T_3^p (xp) + \ldots + B_{m,2} T_m^p (xp)]$$
$$+ T_3^s (xs)[B_{0,3} + B_{1,3} T_1^p (xp) + B_{2,3} T_2^p (xp) + B_{3,3} T_3^p (xp) + \ldots + B_{m,3} T_m^p (xp)]$$
$$+ T_n^s (xs)[B_{0,n} + B_{1,n} T_1^p (xp) + B_{2,n} T_2^p (xp) + b_{3,n} T_3^p (xp) + \ldots + B_{m,n} T_m^p (xp)]$$

Column 13,
Line 29, delete "wire wire" and insert -- wire --.

Signed and Sealed this

Twenty-eighth Day of September, 2004

JON W. DUDAS
*Director of the United States Patent and Trademark Office*